Jan. 18, 1949.  C. E. WEINLAND  2,459,479
SPLIT-PHASE MOTOR REVERSING CIRCUIT
Filed Sept. 27, 1946  2 Sheets-Sheet 1

INVENTOR.
Clarence E. Weinland,
BY
ATTORNEY

Jan. 18, 1949.　　　　　C. E. WEINLAND　　　　2,459,479
SPLIT-PHASE MOTOR REVERSING CIRCUIT
Filed Sept. 27, 1946　　　　　　　　　　　　2 Sheets-Sheet 2

INVENTOR.
Clarence E. Weinland,
BY
ATTORNEY

Patented Jan. 18, 1949

2,459,479

UNITED STATES PATENT OFFICE 2,459,479

SPLIT-PHASE MOTOR REVERSING CIRCUIT

Clarence E. Weinland, Pasadena, Calif., assignor to General Tire and Rubber Company of California, Pasadena, Calif., a corporation of California Application September 27, 1946, Serial No. 699,676

4 Claims. (Cl. 318—207)

This invention relates to reversing circuit means for electric motors of the so-called "split-phase" type, and pertains particularly to reversing circuit means which may be incorporated externally of the motor without requiring modification of the motor itself.

One of the particular objects of this invention is to provide a simple and effective reversing circuit mechanism which may readily be incorporated in the leads to a split-phase motor, and which will serve to effect reversal of the direction of rotation of the motor by operation of a simple manual or other type of reversing switch, being effective to secure the desired change in direction of rotation independent of the operating speed of the motor at the moment the switch is operated.

It is well known that the split-phase motor is one of the oldest types of single phase motors employed for commercial use, and is usually employed only where constant direction of rotation is desired in view of the fact that the reversal connection must be effected when the motor is stopped or running at a sub-operative speed. This results from the fact that the split-phase motor comprises essentially a single-phase induction motor equipped with auxiliary or starting winding displaced in magnetic position from and connected in parallel with the main or running winding and in the usual case the auxiliary or starting winding is caused to be automatically disconnected for operation of the motor at normal running speed. Mere reversal of the current to the main or running winding, when the motor is operating at normal speed, will not cause the motor to reverse. In order to reverse the direction of rotation, it is necessary to de-energize the main winding of the motor and allow the motor to slow down to a speed such that the auxiliary winding in parallel with the main winding is re-connected before the reversal may be effected. This difficulty in securing positive reversal of a split-phase motor, of both the resistance-start type, the reactor-start type, and the capacitor-start type, has been in the past overcome by remodeling the switching mechanism which is employed to de-energize the starting winding, but inasmuch as this switching mechanism is normally built within the motor housing it has been necessary to remodel the motor as a whole in order to convert it to a truly reversible motor. This type of remodeling has materially increased the cost of obtaining a reversible motor of the split-phase type, which has resulted in decreased use of this otherwise very desirable type of motor.

According to the present invention, the reversing circuit is established externally of the split-phase motor and includes one or more relay members which are responsive to energization by a conventional reversing switch so long as the motor switch which controls connection of the starting winding remains closed and thereby effects energization of both the starting and running windings of the motor, the relay means being adapted to maintain connection to the running winding of the motor so long as the main operating switch remains in closed position independent of the opening of the starting winding switch as the motor is brought up to operating or running speed, while operative to disconnect the energization of the running winding during the momentary disconnection provided at the reversing switch as it is being switched to opposite polarity or opposite direction position, maintaining the running winding out of energized condition so long as the switch associated with the starting winding remains open due to rotation of the motor.

The above and other features of this invention will be brought out in the ensuing description of certain preferred embodiments thereof, or will be apparent therefrom. Referring to the drawings, illustrating the above-mentioned embodiments:

Figure 1:
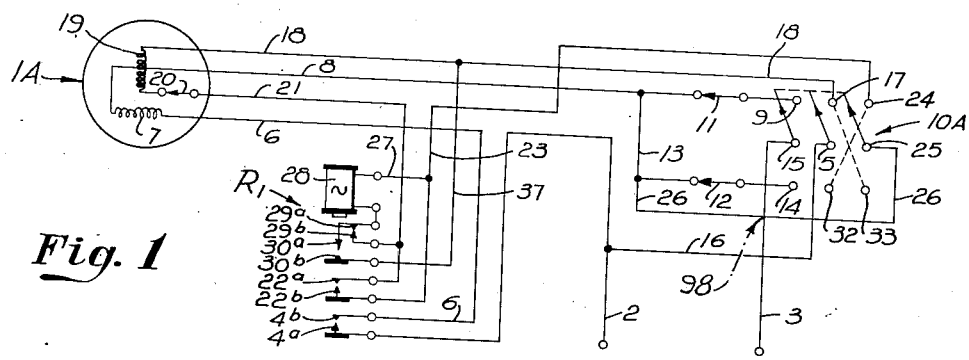
Fig. 1 is a schematic representation of a reversing circuit for a split-phase motor, employing a single relay.

Referring to Fig. 1 of the drawings, the reversing circuit of this invention may comprise a motor $1A$ adapted to be connected to line leads 2 and 3 through the agency of a relay $R_1$ and associated wiring. Associated with the relay $R_1$ I provide a pair of contacts $4a$ and $4b$ constituting a normally open pair, one of which contacts is connected to one of the line leads such as the lead 2 and the other contact is connected through lead 6 to one side of the running winding 7 of the motor 1A then through lead 8 to a three-pole double throw pole-changing switch, as to the upper left contact 9 of the switch shown at 10A. I have shown a limit switch 11 in the lead 8, as well as a limit switch 12 in a branch lead 13 leading to the lower left contact 14 of the switch 10A, which limit switches 11 and 12 are adapted to break the circuit to the running winding 7 in the event the device operated by the motor 1A reaches allowable limits of travel in the respective directions of rotation, the switch 11 being operative in the rotative direction established when the pole-changing switch 10A is connected to the upper set of contacts, and the limit switch 12 being operative in the rotative direction established when the pole-changing switch 10A is connected to the lower set of contacts. To provide the desired circuit return for the running winding 7 through the switch 10A, the center left contact 15 is connected to line lead 3.

For energization of the starting winding, I run a branch lead 16 from line lead 2 to the center contact 5 of the switch 10A, and from the upper center contact 17 of the switch 10A I run a lead 18 to one end of the starting winding 19 thence through a centrifugal or other type of switch 20 operable to open and closed positions in response to the speed or other operative condition of operation of the motor 1A, thence through lead 21 through a pair of normally open contacts 22a, 22b associated with the relay R1, thence back to the other side of the switch 10a through lead 23 connecting to the upper right contact 24 connectable to the right center contact 25 of the switch thence through lead 26 to the branch lead 13, from which the return connection to the line lead 3 is had through the limit switch 11 and contacts 9 and 15. Energization of the relay R1 is provided through a lead 27 connected to the lead 23 thence to actuating coil 28 of the relay R1 thence through a pair of normally closed contacts 29a, 29b to the lead 21, placing the actuating coil 28 in series with the starting winding 19 through switch 20 as the switch 10A is closed to start operation of the motor 1A. Associated with the relay R1 I provide a set of normally open contacts 30a and 30b which cooperate with the contacts 29a and 29b in a "make-before-break" system, so that the contacts 30a and 30b will close momentarily ahead of the opening of the contacts 29a and 29b when the coil 28 of relay R1 is energized. Upon closing of the contacts 30a and 30b, which are connected through the coil 28 to the lead 23 on the one side and the lead 31 on the other side which connects to the switch side of the starting winding 19. This latter connection, i. e., when the contacts 30a and 30b are closed and the contacts 29a and 29b are open, places the relay coil 28 in parallel with the starting winding 19 so that it will remain operative after the switch 20 operates to disconnect the starting winding 19 for the motor 1A, which happens when the motor 1A has come up to the desired speed called for by the design of the motor 1A, i. e. when it has come up close to running condition. The contacts 32 and 33 of the pole-changing switch 10A are cross-connected respectively to contacts 24 and 17, wherefore operation of the switch 10A to connect the lower contacts 14, 32 and 33 will result in reversed polarity on the starting winding 19 while maintaining the same polarity of connection through the contacts 4a—4b to the running winding 7, as will be apparent.

The operation of the circuit shown in Fig. 1 is as follows: Assuming the switch 10A to be closed to connect the line leads to the upper set of contacts 9, 17 and 24, and assuming the motor 1A to be in rest condition, in which condition the switch 20 will be closed, the coil 28 of the relay R1 will be energized by virtue of connection from line lead 2 through lead 16 to contact 5 then to contact 17 and through lead 18 to the starting winding 19 through switch 20, lead 21 to the contacts 29a—29b, thence through the coil 28, lead 27 to lead 23 thence to contact 24, contact 25, cross-lead 26, branch lead 13, through limit switch 11 to contact 9, thence to contact 15 and line lead 3. Energization of the actuating coil 28 of the relay will pull in the movable contacts 4a, 22b and 30b associated therewith. Closure of the contacts 4a—4b will energize the running winding 7 and the motor 1A will start immediately upon contacts 22a—22b being closed, which latter contacts will place the starting winding 19 directly across the line. The movable contact 30b is intended to engage the relatively fixed contact 30a and then immediately thereafter the contacts 29a—29b will be open, causing the coil 28 of the relay R1 to be placed in parallel with the starting winding 19. When the motor 1A comes up to speed such as to operate the switch 20, the starting winding 19 will be disconnected and the motor then run on the running winding 7, operation of the switch 20 causing no change in the relay R1. However, since the switch 20 is connected in the circuit between the starting winding 19 and the lead 21 connected to the actuating coil 28, it will be seen that operation of switch 20 to open position opens a circuit connection between said starting winding and said actuating coil and maintains such circuit connection open as long as the switch 20 remains open.

When it is desired to reverse the direction of rotation of the motor 1A the reversing switch 10A is moved from its up-connection position to its down-connection position, and the momentary disconnection of the switch in moving from up to down position will interrupt the supply of current to the coil 28, allowing the contact system connected therewith to return to the position shown at Fig. 1, which again places the coil 28 of the relay R1 in series with the starting winding 19 and switch 20. In this condition, the switch 20 being open as a result of continued rotation of the motor 1A, the relay R1 does not operate and no energization of the motor is effected. As soon as the motor slows down to a running condition such as to cause the switch 20 to close, the cycle of operation above recited is again effected, but owing to the reverse polarity connection provided for the starting winding 19 the motor will promptly reverse.

Figure 2:
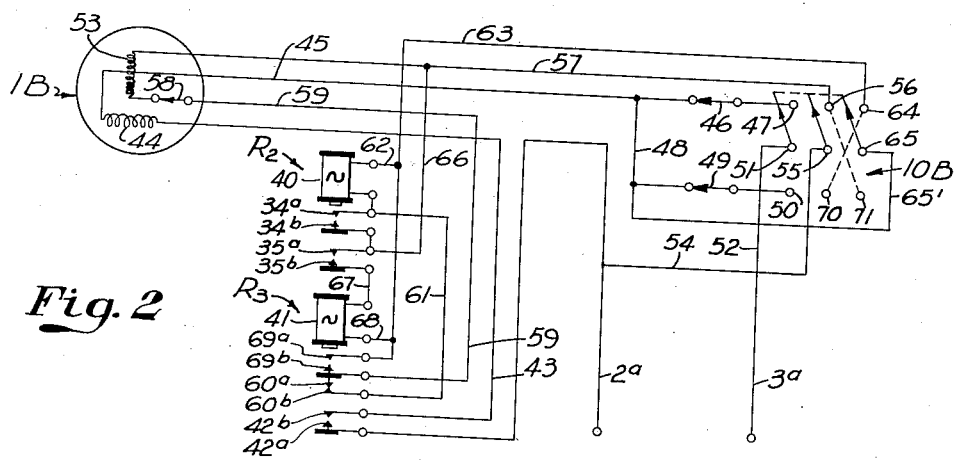
Fig. 2 is a view corresponding to Fig. 1, showing a circuit employing two relays, both of which remain in operation so long as the motor is energized.

In the circuit shown in Fig. 2, the motor 1B is provided with a pair of relays R2 and R3 and a starting circuit which is associated with a pole-changing switch 10B. Line leads 2a and 3a are shown, corresponding to the line leads 2 and 3 above, the relay R3 being provided with a pair of contacts 42a and 42b connected at one side to one of the line leads such as the line lead 2a and at the other side through lead 43 to the running winding 44 then through lead 45 through limit switch 46 to contact 47, corresponding to the contact 9 of the first form, a branch lead 48 corresponding to the branch lead 13, and a limit switch 49 connected to the opposite contact 50 of the switch 10B. The left center contact 51 of the switch 10B is connected to the other line lead such as the line lead 3a, through lead 52. Connection for the starting winding 53 is provided by branch lead 54 running from line lead 2a to the center contact 55 of the switch 10B, whereby the conventional cross-over provided by the pole-changing switch 10B may cause this side of the line to be connected to either side of the winding 53. For example, the center upper contact 56 of the switch 10B is connected through lead 57 to the starting winding 53, the circuit proceeding through the motor switch 58, lead 59 to the movable contact of a normally closed contact pair 60a—60b, thence through lead 61 to the actuating coil 40 of relay R2 thence through connector 62 to lead 63 connected to the upper right contact 64 of switch 10B, the right center contact 65 of switch 10B connecting through lead 65' connecting with branch lead 48. The relay R2 is provided with two pairs of normally open contacts 34a—34b, and 35a—35b. The contact pair 35a—35b is connected on one side through lead 66 to the lead 57 and thence to the power supply, and on the other side through lead 67 to the coil 41 of relay R3 thence through lead 68 to lead 63 which is connected to the opposite side of the power supply. The lead 63 is also connected to one side of a normally open pair of contacts 69a—69b associated with the relay R3, the other side of contacts 69a—69b being connected with the contact 60a of the pair 60a—60b, thence to conductor 59 leading to the starting winding 53, thence through lead 57 to the switch 10B.

With the connections as shown and motor 1B in rest position, the switch 58 being closed, rotation of the motor 1B in one direction is attained by closing switch 10B, as to the upper set of contacts 47, 56, 64. Upon closing the switch in this fashion, the lead 57 is connected to the line lead 2a and the lead 63 is connected to line lead 3a, the circuit for the coil 40 of relay R2 being complete from 56 through lead 57 to winding 53, to switch 58, lead 59 to contacts 60a—60b (normally closed) thence through lead 61 to actuating coil 40 thence through lead 62 to lead 63 connected to contact 64. Upon closing of the switch 10B, as above described, current is then impressed upon the actuating coil 40 which is connected in series with the starting winding 53 through switch 58, causing the contacts 34a—34b and 35a—35b to close. Closure of contacts 34a—34b connects the return side of coil 40 to leads 66 and 57, placing this coil in parallel with the current supply to the starting winding 53. Closing of the contacts 35a—35b connects coil 41 of relay R3 across the line leads 57 and 63, through 66, 35a—35b, 67, 41, 68 and 63, placing this coil 41 in parallel with the current supply to the starting winding 53. Energization of the coil 41 closes the contacts 69a—69b and 42a—42b, and opens contacts 60a—60b. Closing of the contacts 69a—69b energizes the starting winding 53 through 63, 69a—69b, 59, 58, 53 and 57. Opening of contacts 60a—60b will break the R3 return circuit for relay R2, but this coil remains energized through 34a—34b, and relay R3 holds in the circuit by reason of coil 41 being parallel connected across the lead 63—57 through contacts 35a—35b. Closing the contacts 42a—42b energizes the running winding 44 by connecting the return lead for this coil to line lead 2a. When the motor 1B comes up to a speed such as to cause the switch 58 to operate to open position, the starting winding 53 is disconnected and the motor 1B runs on the running winding 44. However, since the switch 58 is connected in the circuit between starting winding 53 and actuating coil 40 of relay R2, operation of said switch to open position opens a circuit connection between said starting winding and said actuating coil and maintains such circuit connection open as long as said switch remains open.

In the event that the switch 10B is operated to reverse the direction of the motor 1B, the momentary disconnection of the switch 10B in shifting from the up position shown in Fig. 2 to the down position will interrupt the supply of current to relay R2, which releases R3, disconnecting the running winding 44 by opening the contacts 42a—42b. The continued high-speed operation of the motor 1B after it is disconnected and until it slows down to the point the switch 58 is again closed takes place while the contacts 69a and 69b remain open, so that no current supply will be available to the starting winding 53 or the running winding 54 until the switch 58 is closed, at which time operation of the relay R2 and the subequent operation of the relay R3 will take place, energizing the running winding 44 in the same polarity as in the first instance and applying a reverse polarity connection to the starting winding 53, causing the motor to be reversed. The lower center and lower right contacts 70 and 71 of the switch 10B are cross-connected to the contacts 56 and 64, as described above in connection with the contacts 32—33 for the switch 10A, effecting a reversal of polarity connections to the leads 57 and 63 so that the desired reversed connection of the starting winding is obtained.

Figure 3:
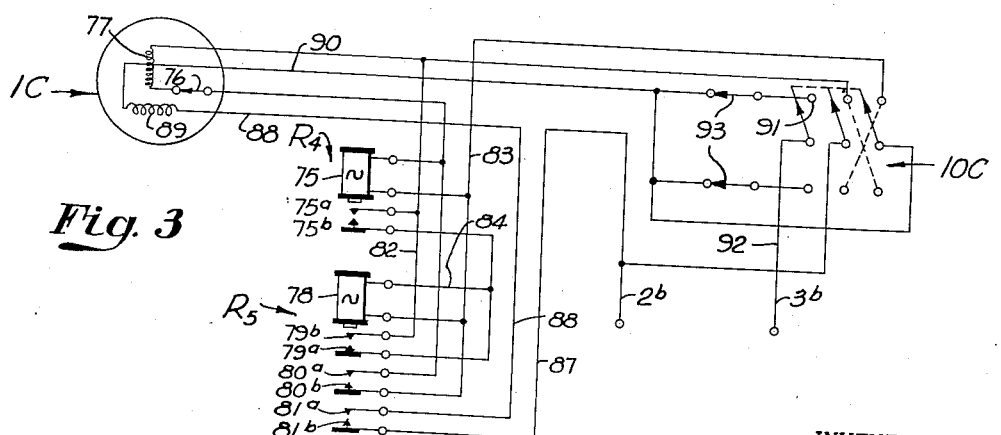
Fig. 3 is a view corresponding to Figs. 1 and 2, showing a two relay circuit in which one of the relays is adapted to drop out of the circuit after the circuit operation has been initiated, the other relay remaining operative so long as the motor is energized.

The circuit shown in Fig. 3 provides two relays R4 and R5 for a split-phase motor 1C under control of a pole-changing switch 10C. The upper relay R4 is provided with an actuating coil 75 having a normally open pair of contacts 75a—75b, the coil 75 being normally in series with the switch 76 for the motor 1C and the starting winding 77, while the relay R5 is provided with a coil 78 and three sets of normally open contacts 79a—79b, 80a—80b, and 81a—81b. A lead 82 is provided, connected to one of the supply leads for the winding 77 and connectable through switch 10C to either of the two line leads 2b and 3b corresponding to the line leads 2 and 3 in the first form of the invention. The opposite polarity side of the switch 10C is connected through lead 83 to one side of each of the coils 75 and 78, the coil 75 being returned through the switch 76 and starting winding 77 and the other side of the coil 78 being returned through lead 84 thence through contacts 75a—75b to lead 82 connected to the supply side of the winding 77, contacts 79a—79b being in parallel with contacts 75a—75b. The contact pair 81a—81b is adapted to provide connection through leads 87 and 88 from the line lead 2b to the running winding 89, the return lead for the running winding 89 being provided as at 90 to the contact 91 of the switch 10C corresponding to the contacts 9 and 47 above, from which the circuit connection to the line lead 3b is had through the switch arm and connector 92. A limit switch network 93 may be provided corresponding to that shown in the first-described forms of the invention.

With the motor 1C in rest position, with the starting circuit switch 76 closed, the actuating coil 75 of relay R4 is in series with the starting winding 77 through switch 76 and upon closing the switch 10C this coil will be energized, closing contacts 75a—75b. Closing of these contacts will provide a return circuit for the coil 78 of relay R5, causing the contacts 79a—79b, 80a—80b and 81a—81b to close. Upon closure contacts 79b—79a act as holding contacts for coil 78, being connected in parallel across the line leads to the starting winding 77, and cause the relay R5 to be closed so long as the switch 10C remains closed. Closure of the contacts 80a—80b will close the starting winding circuit and will shunt the coil 75 of relay R4 causing this relay to open. Closing of the contacts 81a—81b will energize the running winding 89. When the motor 1C has come up to a speed such as to cause the switch 76 to open, no change will be had in the setting of relay R5, it being continuously energized by the supply line connection. In this case also, the operation of switch 76 to open position opens a circuit connection between starting winding 77 and actuating coil 75 of relay R4 and maintains such circuit connection open as long as said switch remains open. In the event it is desired to reverse the direction of operation of the motor 1C, the momentary opening of the switch 10C in the reversing operation will interrupt the supply of current to coil 78, and reconnection of the current supply to coil 75 will not be had until the motor 1C is slowed down sufficiently to cause the switch 76 to close, on which occasion the starting winding 77 will be connected across the line in opposite polarity of that obtained in the first instance, while the running coil 89 of the motor is connected in its original polarity, thus causing the motor to begin to operate in reverse direction.

Figure 4:
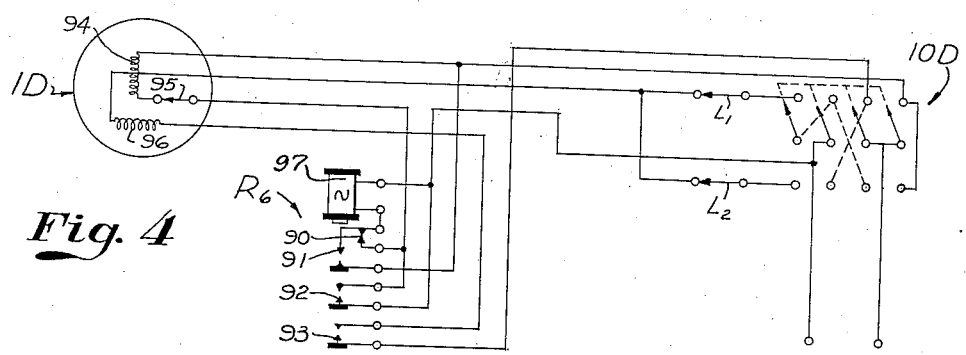
Fig. 4 is a modified form of circuit, conforming generally to that of Fig. 1.

Fig. 4 illustrates a circuit comparable to that shown in Fig. 1, wherein a split-phase motor 10 is under control of a reversing switch 10D and a starting circuit including a relay R6. The relay R6 is provided with contact pairs 90, 91, 92 and 93 corresponding respectively to the contacts 29a—29b, 30a—30b, 22a—22b, and 4a—4b of Fig. 1, for control of the starting winding 94 having a switch 95, and the running winding 96. Said relay is also provided with an actuating coil 97 which corresponds to coil 28 in Fig. 1 and which is similarly connected to corresponding contacts of the relay and to starting winding 94 through switch 95. The motor and R6 circuit is connected to the switch 10D (shown as a four-pole, double-throw switch together with a limit-switch network L1—L2) in such manner that operation of the switch will effect reversal of current in the running winding 96 with respect to that in the starting winding 94.

The above-described circuits show the provision of limit switches, as at 11 and 12, 48 and 49, etc., but it will be appreciated that in installations where no limit switches are required to control the extent of movement of the means operated by the split-phase motor under control, it is a relatively simple matter to convert the circuits to eliminate such limit switches. For example, referring to the circuit shown in Fig. 1, the contacts 9, 14 and 15 of the switch 10A may be eliminated, together with the limit switches 11 and 12 and their connecting leads, and the lead 26 caused to be connected to the line lead 3 at the position of the cross-over designated by the dot-dash arrow 98. The pole-changing switch employed at 10A then becomes a conventional two-pole double-throw reversing switch. Other modifications of the invention will occur to those skilled in the art, and I do not choose to be limited to the specific details and wiring arrangements shown in the present specification, but rather to the scope of the subjoined claims.

I claim:

1. In a reversing circuit means for a so-called split-phase motor having a starting winding and a running winding together with a switch member operable to open position to disconnect the starting winding when the motor has attained a predetermined running condition, and pole-changing switch means; circuit means including relay means having an actuating coil electrically connected to said switch member and adapted to cause energization of said starting and running windings upon closing said switch means when said switch member is closed; and contact means associated with said relay means and adapted upon operation of said relay means to retain energization of said running winding independent of said switch member so long as said switch means remains closed; said actuating coil being connected to said starting winding through said switch member whereby operation of said switch member to open position opens a circuit connection between said actuating coil and said starting winding when said motor has attained said predetermined running condition.

2. A reversing circuit means for a so-called split-phase motor having a starting winding and a running winding together with a switch member operable to open position to disconnect the starting winding when the motor has attained a predetermined running condition, which comprises: pole-changing switch means; circuit means including relay means having an actuating coil electrically connected to said switch member and adapted to be energized upon closing said switch means only when said switch member is in closed position; and contact means responsive to the operation of said relay means and adapted to effect separate energization of said starting and running windings, and to maintain energization of said running winding independent of disconnection of said starting winding as a result of operation of said switch member to open position so long as said switch means remains closed; said actuating coil being connected to said starting winding through said switch member whereby operation of said switch member to open position opens a circuit connection between said actuating coil and said starting winding when said motor has attained said predetermined running condition.

3. A reversing circuit means for a so-called split-phase motor having a starting winding and a running winding together with a switch member adapted to disconnect the starting winding when the motor has attained a predetermined running condition, which comprises: pole-changing switch means; circuit means including relay means provided with first contact means normally closed to establish series connection of said relay means with said starting winding and said switch member and adapted to effect energization and operation of said relay means upon closing said switch means when said switch member is in closed condition, second contact means for said relay means adapted to connect said relay means in parallel with said starting winding and to disconnect said first contact means upon operation of said relay means, third contact means for said relay means adapted to energize said starting winding upon operation of said relay means, and fourth contact means for said relay means adapted to energize said running winding upon operation of said relay means, said pole-changing switch means and said circuit means being adapted for alternative connection of one of said winding to opposite polarity conditions relative to the polarity of the other of said windings.

4. A reversing circuit means for a so-called split-phase motor having a starting winding and a running winding together with a switch member adapted to disconnect the starting winding when the motor has attained a predetermined running condition, which comprises: pole-changing switch means; motor circuit means for said pole-changing switch means and said first and second relay means; first contact means associated with said second relay means normally connecting said first relay means in series with said starting winding and said switch member; contact means associated with said first relay means movable upon energization of said first relay means to energize said second relay means and to connect said first relay means in parallel with said starting winding whereby said first relay means remains energized so long as current supply to said motor is maintained through said pole-changing switch means independent of the operative condition of said switch member; second contact means associated with said second relay means and movable upon energization of said second relay means to energize said starting winding; and third contact means movable in response to energization of said second relay means to cause energization of said running winding.

CLARENCE E. WEINLAND.

REFERENCES CITED

The following references are of record in the file of this patent:

UNITED STATES PATENTS

| Number | Name | Date |
|---|---|---|
| 2,320,176 | Dunham et al. | May 25, 1943 |